US012725617B2

(12) United States Patent
Glackin et al.

(10) Patent No.: US 12,725,617 B2
(45) Date of Patent: Sep. 1, 2026

(54) SELF-LEARNING END-TO-END AUTOMATIC SPEECH RECOGNITION

(71) Applicant: VERINT SYSTEMS UK LIMITED, Woking (GB)

(72) Inventors: Cornelius Patrick Glackin, London (GB); Nigel Henry Cannings, London (GB)

(73) Assignee: Verint Systems UK Limited, Woking (GB)

( * ) Notice: Subject to any disclaimer, the term of this patent is extended or adjusted under 35 U.S.C. 154(b) by 326 days.

(21) Appl. No.: 18/552,405

(22) PCT Filed: Nov. 7, 2022

(86) PCT No.: PCT/EP2022/080969
§ 371 (c)(1),
(2) Date: Sep. 25, 2023

(87) PCT Pub. No.: WO2023/083742
PCT Pub. Date: May 19, 2023

(65) Prior Publication Data

US 2024/0119942 A1 Apr. 11, 2024

(30) Foreign Application Priority Data

Nov. 11, 2021 (GB) ...................................... 2116251

(51) Int. Cl.
*G10L 17/04* (2013.01)
*G10L 13/02* (2013.01)
(Continued)

(52) U.S. Cl.
CPC .............. *G10L 17/04* (2013.01); *G10L 13/02* (2013.01); *G10L 17/02* (2013.01); *G10L 17/14* (2013.01)

(58) Field of Classification Search
CPC . G10L 15/063; G10L 21/0208; G10L 15/005; G10L 15/26; G10L 15/20; G10L 15/06; G10L 15/187; G06F 16/3344
See application file for complete search history.

(56) References Cited

U.S. PATENT DOCUMENTS 6,044,343 A * 3/2000 Cong ...................... G10L 15/20
704/256.4
6,308,151 B1 * 10/2001 Smith ..................... G10L 15/26
704/E15.044

(Continued)

OTHER PUBLICATIONS

Search Report and Written Opinion of the International Searching Authority in PCT application PCT/EP2022/080969 mailed on Feb. 7, 2023 (8 pages).

*Primary Examiner* — Jakieda R Jackson
(74) *Attorney, Agent, or Firm* — Dinsmore & Shohl LLP

(57) ABSTRACT

The present invention provides a system for self-learning end to end automatic speech recognition. The system comprises a memory. The memory stores a language model, a noise database and an automatic speech recognition, ASR, model.
The system further comprises a processor. The processor may be hardware based or it may be cloud based. The processor is configured to run: an application programming interface (API); a text extractor; a language model builder; a pronunciation model; a text to speech engine; and a mixer. The text to speech engine may also be referred to as a text to speech converter.
The system provides automatic updating of the ASR model to improve accuracy of the ASR functionality of the system without the need for complete retraining.

15 Claims, 3 Drawing Sheets

Figure 1:
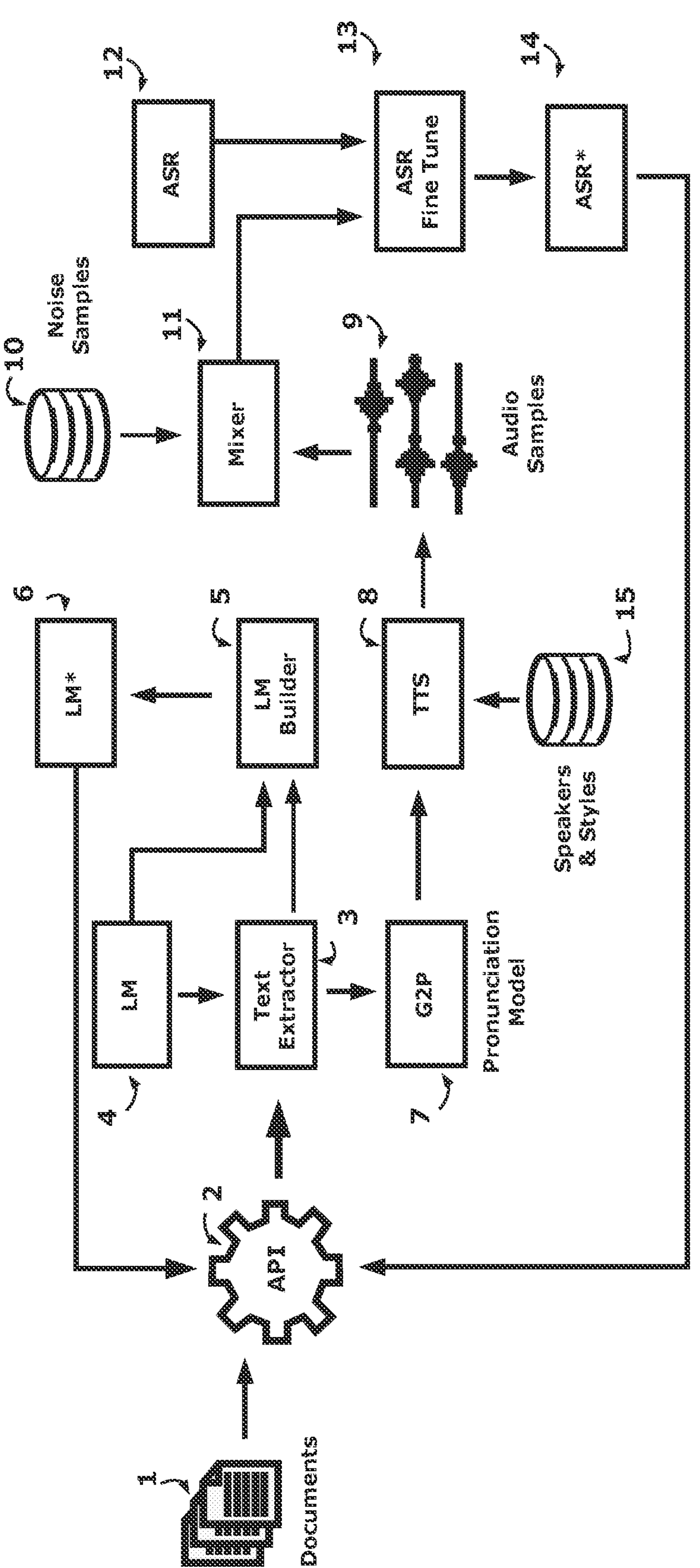

(51) Int. Cl.
*G10L 17/02* (2013.01)
*G10L 17/14* (2013.01)

(56) References Cited

U.S. PATENT DOCUMENTS 8,457,959 B2 * 6/2013 Kaiser .................... G09B 19/04 704/231
8,583,432 B1 * 11/2013 Biadsy .................. G10L 15/063 704/235
9,990,926 B1 * 6/2018 Pearce .................... G10L 15/05
10,614,827 B1 * 4/2020 Korjani ............... G10L 21/0364
11,024,194 B1 * 6/2021 Beigman Klebanov .................... G09B 17/04
2004/0230420 A1 * 11/2004 Kadambe ................ G10L 15/07 704/E15.011
2008/0153537 A1 * 6/2008 Khawand ................. H04R 5/02 455/550.1
2011/0238407 A1 * 9/2011 Kent ....................... G10L 15/26 704/3
2012/0109649 A1 * 5/2012 Talwar .................... G10L 15/08 704/E15.001
2015/0058019 A1 * 2/2015 Chen ....................... G10L 13/08 704/260
2015/0161370 A1 * 6/2015 North ....................... G07C 9/37 726/5
2015/0293908 A1 * 10/2015 Mathur ................... G06F 40/44 704/2
2016/0027452 A1 * 1/2016 Kalinli-Akbacak .... G10L 17/26 704/240
2016/0140951 A1 * 5/2016 Agiomyrgiannakis ...................... G10L 13/02 704/260
2016/0379626 A1 12/2016 Deisher et al.
2018/0144736 A1 * 5/2018 Huang ................. G10K 11/178
2018/0233129 A1 * 8/2018 Bakish .................... G10L 25/06
2018/0295240 A1 * 10/2018 Dickins ................. H04M 3/568
2019/0012594 A1 * 1/2019 Fukuda ................... G10L 15/16
2020/0111484 A1 4/2020 Aleksic et al.
2020/0243094 A1 * 7/2020 Thomson ................ G10L 15/28
2020/0312337 A1 * 10/2020 Stafylakis ............... G10L 17/00
2020/0357388 A1 11/2020 Zhao et al.
2020/0372897 A1 * 11/2020 Battenberg ............. G06N 3/045
2021/0043220 A1 * 2/2021 Baek ....................... G10L 25/30
2021/0248801 A1 * 8/2021 Li .......................... G06T 13/205
2022/0392478 A1 * 12/2022 Hijazi ................. G10L 21/0364

* cited by examiner

SELF-LEARNING END-TO-END AUTOMATIC SPEECH RECOGNITION

CROSS-REFERENCE TO RELATED APPLICATION(S)

This is a National Stage Application under 35 U.S.C. § 371 of International Application No. PCT/EP2022/080969, filed on Nov. 7, 2022, which claims priority to GB Patent Application No. 2116251.6, filed on Nov. 11, 2021, the entireties of which are incorporated herein by reference.

BACKGROUND

Modern Automatic Speech Recognition (ASR) is based on end-to-end models (Graves, 2014) that learn to classify spectral features (e.g., spectrograms) and output character labels. They are based on a training algorithm called Connectionist Temporal Classification (Graves, 2006). This provides a string of characters (graphemes) that we then need to convert to words typically with an n-gram language model ("LM") using an algorithm called Prefix Beam Search (Hannon, 2014).

Hence, in the end-to-end pipeline prefix beam search (decoding) is dependent on both the raw CTC output and the language model. Prefix Beam Search uses the strings of characters and an n-gram language model to convert the characters into words e.g., BOX_BUNNI>BUGS BUNNY The challenge is when we want the ASR to recognise new words that adding them to the LM often doesn't trigger them coming out in the output. In earlier systems that relied on decoding audio to phonemes, the LM could map new words more accurately to the incoming phonemes, as the search space was smaller. Character-based systems produce a wider range of possible outputs for any given word or phrase which makes the approach of trying to add new words to an ASR system in the post-processing, LM stage, less efficient.

To overcome this, there is a need for systems and methods to adapt the ASR system to include new words. When both the LM and ASR have been adapted only then will new words and phrases be recognised reliably by an end-to-end CTC-based ASR system.

SUMMARY

The present invention in its various aspects is as set out in the appended claims.

The present invention provides a system for self-learning end-to-end automatic speech recognition. The system comprises a memory. The memory stores a language model, a noise database and an automatic speech recognition, ASR, model.

The system further comprises a processor. The processor may be hardware-based or it may be cloud-based. The processor is configured to run: an application programming interface (API); a text extractor; a language model builder; a pronunciation model; a text to speech engine; and a mixer. The text to speech engine may also be referred to as a text to speech converter.

The processor is configured to receive client text documents via the API. The client may upload documents from their area of work. The documents may include one or more of emails, Q&A information and acronyms. This has the benefit that the automatic speech recognition system will learn the language and jargon specific to the client's field of work.

The processor is further configured to use the text extractor to determine out of vocabulary, OOV, words from the client text documents. OOV words may be words that are not contained in a lexicon of the language model that is stored in the memory. The processor may compare each word extracted by the text extractor against the words in the lexicon. If an extracted word does not match any of the words in the lexicon, then it is an out of vocabulary word.

The processor is further configured to use the text extractor to extract sentences containing out of vocabulary, OOV, words from the client text documents.

The text extractor may be based on Spacy or NLTK toolboxes. The text extractor preferably tokenises the text to remove strange characters and markup text such as HTML tags and then extracts sentences.

The processor is configured to use the extracted sentences to create an n-gram based language model using the language model builder. the processor is subsequently configured to add the n-gram based language model to the language model stored in memory. This results in the language model in the memory being updated to include the out of vocabulary words. This is beneficial as a client can be provided with a system that includes a generically trained ASR model and then upload text documents specific to their area of work in order to fine-tune the system to include language specific to their technical field. The processor preferably uses interpolation using an n-gram language modelling toolkit that uses Neyser Ney Smoothing to add the n-gram based language model to the language model stored in memory.

The processor is configured to process the extracted sentences using the pronunciation model to produce a phonetic sequence of the OOV words. Using a pronunciation model ensures that the correct pronunciation of the new words and phrases is incorporated into the system. This step allows for correctly pronounced audio samples of the new words to be generated. The pronunciation model is preferably a Grapheme-to-phoneme model (G2P). The G2P model can be statistical e.g., Phonetisaurus (Novak, 2015) which has learned the alignment using Expectation Maximisation between OOV words and their phonetic sequences, or it could be deep learning-based using BERT (Devlin, 2018).

The Processor is then configured to generate a plurality of audio samples for each sentence using the text to speech engine (TTS). That is, for each sentence containing one or more OOV words, the TTS generates a plurality of audio samples, each of the plurality of audio samples is of a different speaker and speaking style combination speaking that sentence. The TTS may be deep learning based, for example, NVIDIA Flowtron (Valle, 2020) which optionally has been trained to synthesise many different male and female voices and speaking styles. In this way, the TTS may be used to generate a range of audio samples for each sentence that includes one or more OOV words. The TTS may comprise a synthesiser and a vocoder.

The memory may preferably store speakers and styles (speaking styles) that the text to speech engine can emulate. The speakers and styles are preferably those that were used to train the text to speech engine. The speakers are voices that the TTS can emulate and the styles are the styles of speaking, for example, fast, slow, with a particular accent.

The processor is further configured to augment, using the mixer, the plurality of audio samples with noise from the noise database. This has the benefit of simulating real spoken and recorded audio that would have an element of background noise ensuring that the updated ASR has improved robustness to noise. The mixer is preferably a reverberant noise mixer.

The processor is then configured to fine tune the ASR model stored in memory using the noise augmented audio samples. This results in the ASR model stored in the memory being updated in such a way that it can better recognise the OOV words when spoken.

The processor may then make the updated ASR model and the updated language model available to the API so that the client (user) may use the ASR model to create transcripts of their chosen audio. The API is preferably configured to function so as to provide ASR functionality to a user. By making the updated ASR model and language model available to the API, the ASR function of the API improves in accuracy.

When using the ASR model, the client may find that some speakers whose audio they are transcribing using the ASR model are not well understood by the model, these speakers are referred to as problematic speakers. To be clear, it is intended that a speaker is a person. To train the model to specifically improve understanding of poorly understood speakers, the processor may further be configured to: Receive client audio via the API. The client audio comprising an audio recording of one or more speakers. The processor may then be configured to process the audio using the ASR model to produce a speaker separated transcript: The ASR model preferably has a biometric component that identifies the speakers (using diarization technology) and produces a speaker separated transcript. Each utterance (segment, unbroken speech by one speaker) of the transcript may be tagged with a speaker identifier (spk_id).

The processor may then be configured to analyse the confidence of the transcription for each speaker utterance. The confidence may preferably be expressed as a percentage.

If the confidence of the transcript of a speaker's utterance is below a threshold confidence limit, the processor will extract the x-vector voice print of the speaker from the client audio. The processor will then match the x-vector voice print to the nearest matching similar speaker in the speakers and styles in the memory: the matching may preferably be done using a similarity measure, preferably Cosine distance.

The processor may then select the nearest matching speaker from the speakers and styles stored in the memory and process the speaker's utterance using the processing model to produce a phonetic sequence of the speaker's utterance. This ensures that the processor knows phonetically what the speaker said.

The processor may then process the resulting phonetic sequence of the speaker's utterance with the nearest matching speaker using the text to speech engine to generate a plurality of nearest matching speaker audio samples. Each of the plurality of nearest matching speaker audio samples may be generated to reflect the voice of the nearest matching speaker with a different speaking style.

The processor may then augment, using the mixer, the plurality of audio nearest matching speaker audio samples with noise from the noise database and fine tune the ASR model stored in memory using the noise augmented nearest matching speaker audio samples.

The threshold confidence limit may be user selected. The confidence threshold is preferably between 75 and 99%, further preferably between 85 and 95%.

By generating audio samples that are similar to the speech of the problematic speaker, the ASR model can be updated without the need for the problematic speaker to provide training data. The x-vector of the problematic speaker can simply be taken from the audio that first indicated the speaker was not being well understood by the ASR model. Without the present invention to generate similar audio samples, the problematic speaker would be required to spend time producing sample audio by reading from a pre-defined script. This is not only time consuming, but if the speaker were to deviate from the script, then the training audio and what the system is instructed that the training audio is saying (the script) will not match which would result in the ASR model being rendered inaccurate as a result. Furthermore, the present invention allows for the ASR model to be updated in an ongoing way as new problematic speakers are identified. The system can continuously update itself by adding different synthesised voices and groundtruth. This may be an iterative update process of fine tuning the ASR and is preferable to a complete retrain which would take the system offline for a considerable amount of time, potentially weeks.

To further improve personalisation and accuracy of the ASR model, the system may provide for a problematic speaker's voice to be directly simulated and used to fine tune the ASR model. To achieve this, the processor may be further configured to concatenate the x-vector voice print of the problematic speaker with the phonetic sequence of the speaker's utterance and use the resulting concatenation to generate a problematic speaker audio sample using the text to speech engine.

The processor will then augment, using the mixer, the plurality of audio problematic speaker audio sample with noise from the noise database and fine tune the ASR model stored in memory using the noise augmented problematic speaker audio sample.

To further improve the ASR model, the system may be configured such that the processor can update the ASR model using training text. In this case, the memory stores ASR training text and the processor is further configured to process the training text using the pronunciation model to produce a phonetic sequence of the training text, use the text to speech engine to generate one or more training text audio samples using the phonetic sequence of the training text and speakers and styles from the speakers and styles in the memory. The processor is then configured to augment, using the mixer, the one or more training text audio samples with noise from the noise database, and fine tune the ASR model stored in memory using the one or more noise augmented training text audio samples. This has the benefit that the ASR model can be updated and improved without any input by the client. The processor may be configured to repeat the above steps using different speakers and styles each time so as to continuously update the ASR model and broaden the range of speakers and styles it can accurately recognise without need for client input.

In another aspect, the present invention provides a computer implemented method self-learning end to end automatic speech recognition using the system as described above. The method comprises:

Receiving client text documents via the API;

determining out of vocabulary, OOV, words from the client text documents using the text extractor;

extracting sentences containing out of vocabulary, OOV, words from the client text documents using the text extractor;

using the extracted sentences and language model builder to create an n-gram based language model;

adding the n-gram based language model to the language model stored in memory;

processing the extracted sentences using the pronunciation model to produce a phonetic sequence of the OOV words;

generating a plurality of audio samples for each sentence using the text to speech engine;

augmenting, using the mixer, the plurality of audio samples with noise from the noise database; and fine tuning the ASR model stored in memory using the noise augmented audio samples.

As such, the method provided allows for an ASR model to be fine-tuned to better recognise vocabulary used in a client's area of work. This fine tuning improves the accuracy of the transcription and removes the need for complete retraining of the ASR which would be time consuming and computing power intensive.

It may be preferable that the memory stores speakers and styles that the text to speech engine can emulate.

When using the ASR model, the client may find that some speakers whose audio they are transcribing using the ASR model are not well understood by the model, these speakers are referred to as problematic speakers. To train the model to specifically improve understanding of poorly understood speakers, the method may further include:

Receiving client audio via the API;

Processing the audio using the ASR model to produce a speaker separated transcript; Analysing the confidence of the transcription for each speaker utterance;

If the confidence of the transcript of a speaker's utterance is below a threshold confidence limit:

Extracting the x-vector voice print of the speaker from the client audio;

Matching the x-vector voice print to the nearest matching similar speaker in the speakers and styles in the memory;

Selecting the nearest matching speaker from the speakers and styles stored in the memory;

Processing the speaker's utterance using the processing model to produce a phonetic sequence of the speaker's utterance;

Processing the phonetic sequence of the speaker's utterance with the nearest matching speaker using the text to speech engine to generate a plurality of nearest matching speaker audio samples;

augmenting, using the mixer, the plurality of audio nearest matching speaker audio samples with noise from the noise database;

fine tuning the ASR model stored in memory using the noise augmented nearest matching speaker audio samples.

By doing this, the method allows for the ASR to be fine-tuned to better recognise speech by a problematic speaker. This is advantageously done without the need for the problematic speaker to provide any further audio.

To further improve personalisation and accuracy of the ASR model; the method may further include by the processor: concatenating the x-vector voice print with the phonetic sequence of the speaker's utterance;

Using the resulting concatenation to generate a problematic speaker audio sample using the text to speech engine;

augmenting, using the mixer; the plurality of audio problematic speaker audio sample with noise from the noise database; and fine tuning the ASR model stored in memory using the noise augmented problematic speaker audio sample.

To further improve the ASR model, the system may be configured such that the processor can update the ASR model using training text.

This has the benefit that the ASR model can be updated and improved without any input by the client. As such, the method may further include:

by the processor:

processing the training text using the pronunciation model to produce a phonetic sequence of the training text;

using the text to speech engine to generate one or more training text audio samples using the phonetic sequence of the training text and speakers and styles from the speakers and styles in the memory;

augmenting, using the mixer, the one or more training text audio samples with noise from the noise database; and fine tuning the ASR mode stored in memory using the one or more noise augmented training text audio samples.

The processor may further be configured to repeat the steps of claim 5 using different speakers and styles each time so as to continuously update the ASR model and broaden the range of speakers and styles it can accurately recognise without the need for client input.

DETAILED DESCRIPTION

The present invention will now be described in terms of the following figures:

FIG. 1: A flow diagram according to an aspect of the present invention

Figure 2:
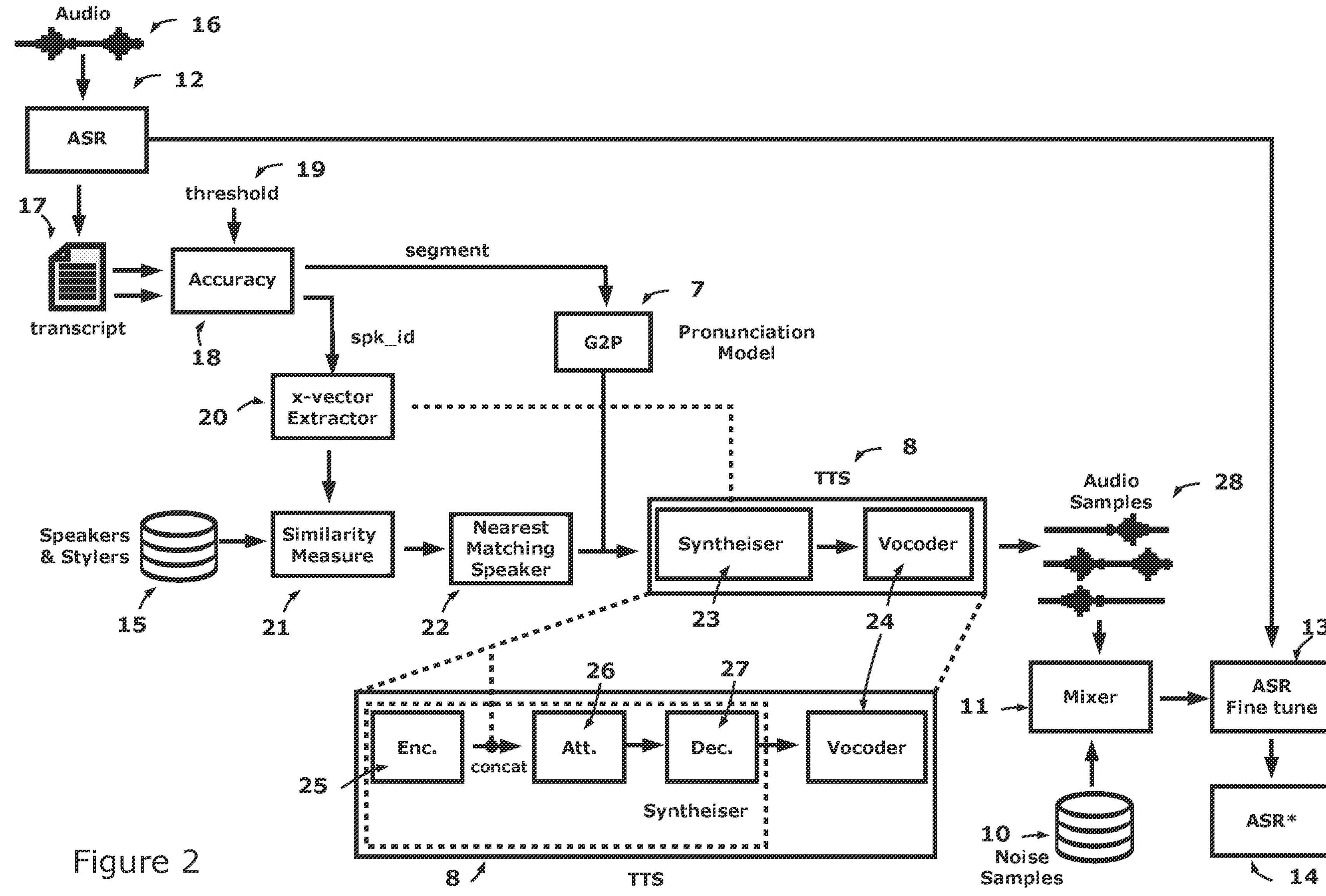

FIG. 2: A flow diagram according to an aspect of the present invention

Figure 3:
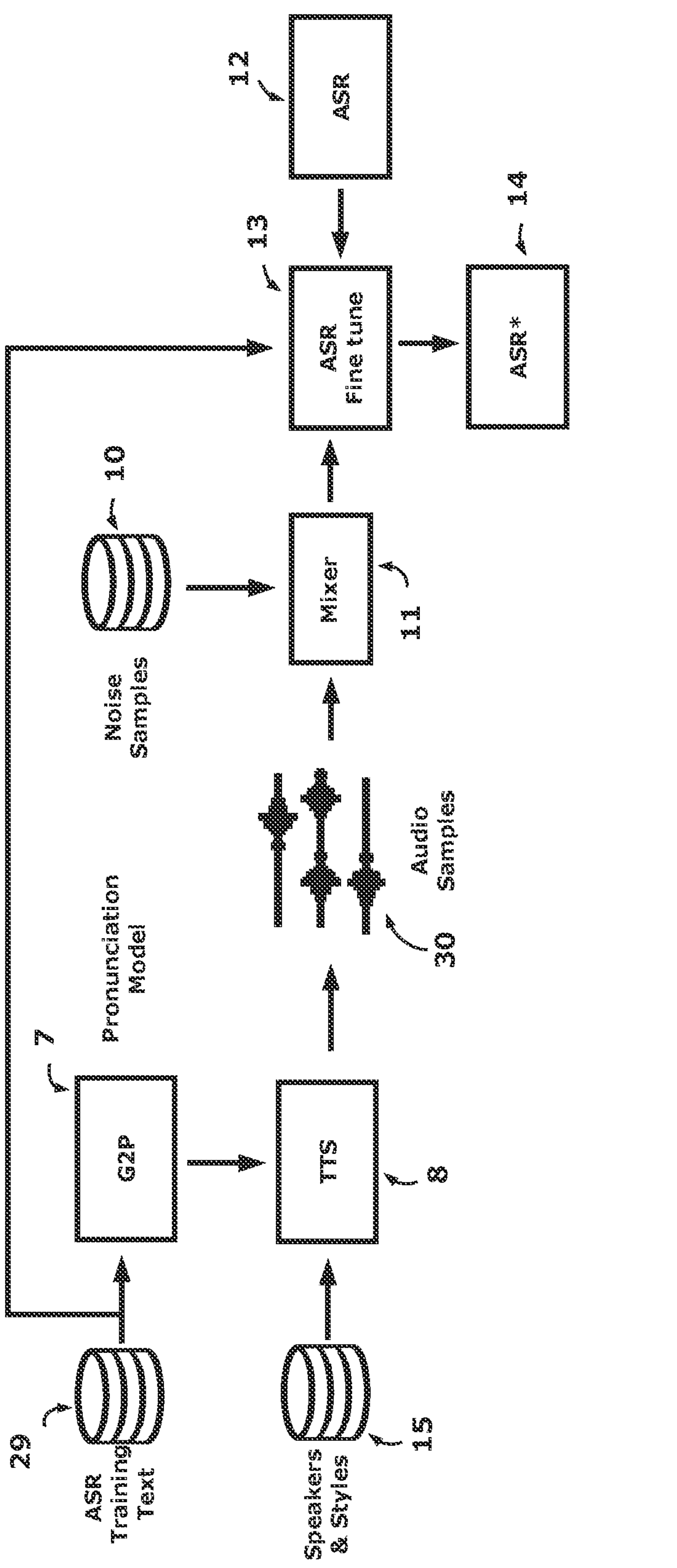

FIG. 3: A flow diagram according to an aspect of the present invention

The present invention will be described in terms of the following features:

1: Client Text Documents
2: Application Programming Interface, API
3: Text Extractor
4: Language Model, LM
5: Language Model Builder
6: Updated Language Model
7: Pronunciation Model
8: Text to Speech Engine, TTS
9: Audio Samples
10: Mixer
11: Noise Samples
12: Automatic Speech Recognition, ASR, model
13: Fine Tuning of the ASR Model
14: Updated ASR model
15: Speakers and Styles
16: Client Audio
17: Transcript
18: Accuracy Determination
19: Threshold Confidence Limit
20: x-vector Extractor
21: Similarity Measure
22: Nearest Matching Speaker
23: Synthesiser
24: Vocoder
25: Synthesiser Encoder
26: Synthesiser Attention Mechanism
27: Synthesiser Decoder
28: Nearest Matching Speaker Audio Samples
29: ASR Training Text
30: One Or More Training Text Audio Samples In the figures, like features are given like numerals.

In FIG. 1, the client uploads their text documents 1, to the API (2). The processor extracts sentences containing out of vocabulary words (OOV) from the text using the Text Extractor (3). These extracted sentences are used by the Language Model Builder (5) to create an n-gram based Language Model, this n-gram based Language Model is then added to the existing Language Model (4) to produce an updated Language Model.

The extracted sentences contain out of vocabulary words that are identified by comparison to the terms in the lexicon of the existing LM (4), the OOV words are then processed by a Pronunciation model, in this case, a Grapheme-to-Phoneme model (G2P) (7) to generate the phonetic sequence of the words in the extracted sentences. This determines the pronunciation of these new words and phrases.

The phonetic sequence of the words in the extracted sentences is then used by the Text to Speech engine, TTS (8) to generate a plurality of audio samples (9) for each sentence. For each of the plurality of audio samples, the TTS (8) will use a different combination of speaker and style from the speakers and styles (15) stored in the memory to simulate spoken audio. The ITS generated audio samples (9) are then augmented with noise samples (11) from a noise database using a mixer (10) to simulate realistic noise affected audio (noise augmented audio samples). The noise augmented audio samples are then used to fine tune (13) the existing ASR model (12) which results in an Updated ASR (ASR*) model (14).

Finally, the updated language model (LM*) (6) and Updated ASR (14) are made available to the API (2) for future ASR inferencing.

In FIG. 2, The client uploads client audio (16) to be processed to the ASR (12). The ASR generates a transcript (17). The ASR preferably has a biometric component that identifies the speakers (using diarization technology) and produces a speaker separated transcript. Each utterance (segment) of the transcript is tagged with a speaker identifier (spkid). The processor assesses the quality of the transcript (17) by performing and accuracy determination (18) by doing so analysing the confidence of the transcript (17) for each individual speaker utterance. If the confidence for a particular utterance is below a pre-determined threshold (19) the processor proceeds to augment the ASR model (12) with data similar to the problematic speaker to improve the function of the ASR. The particular utterance that is below the confidence limit may be referred to as a problematic segment or problematic utterance.

The processor extracts the x-vector voice print for the speaker by an x-vector extractor (20). The processor then matches the voice print to the nearest matching speaker (22) of the speakers in the speakers and speaking styles stored in the memory using a similarity measure (21). The similarity measure 21 may be a Cosine distance. The nearest matching speaker (22) is selected by the TTS (12). The problematic segment identified from (4) is put through a Pronunciation Model (7) which is a Grapheme-to-Phoneme converter to generate the phonetic sequence of the utterance to ensure that the pronunciation for the utterance is correct. The TTS (7) uses the resulting phonetic sequence along with the nearest matching speaker (22) to make Nearest Matching Speaker Audio Samples (28) which will be the basis of fine tuning the ASR. Before fine tuning the ASR using the Nearest Matching Speaker Audio Samples, the Nearest Matching Speaker Audio Samples (28) are reverberantly mixed using a mixer (11) with noise samples (10). ASR fine tuning (13) of the existing ASR model (12) is then performed and an updated model is produced (ASR*) (14).

Additionally, to achieve hyper-personalisation of target voices, the extracted x-vector may be concatenated with the phoneme output of the G2P model (7) to directly synthesise the target speaker (problematic speaker) voice output of the TTS system (8). More specifically, the x-vector speaker embedding is concatenated into the output of the encoder part of the synthesiser (25) (see synthesiser inset in FIG. 2) before the attention mechanism (26) and the decoding (27). Here, the synthesiser has preferably been trained to take speaker embeddings as a reference as part of its inferencing process.

FIG. 3 outlines how the ASR model may be continuously adapted by using TTS with a wide number of speakers to augment its training data with new speakers and noise sources as part of an ongoing automatic process. ASR Training Text (29) and Speaker and Speaking Styles (15) are used to generate new training text audio samples (30) using the G2P Pronunciation Model (7) and TTS (8). A range of Noise Samples (10) are reverberantly mixed into the training text audio samples (30) The resulting noise augmented training text audio samples are used to fine tune (13) the existing ASR model (12) resulting in an updated model ASR* (14). This is an ongoing process that continuously evolves the ASR model over time by using different synthesised voices and groundtruth.

The invention claimed is:

1. A system for self-learning end to end automatic speech recognition (ASR), the system comprising:
- a memory; wherein the memory stores a language model, a noise database and an automatic speech recognition model;
- a processor;
- the processor configured to run:
  - an application programming interface (API);
  - a text extractor;
  - a language model builder;
  - a pronunciation model;
  - a text to speech engine; and
  - a mixer; and
- the processor configured to:
  - receive client text documents via the API; and
  - using the text extractor:
    - determine out of vocabulary (OOV), words from the client text documents;
    - extract sentences containing OOV words from the client text documents;
    - use the extracted sentences to create an n-gram based language model using the language model builder;
    - add the n-gram based language model to the language model stored in memory;
    - process the extracted sentences using the pronunciation model to produce a phonetic sequence of the OOV words;
    - generate a plurality of audio samples for each sentence using the text to speech engine;
    - in response to generating the plurality of audio samples for each sentence using the text to speech engine:
    - augment, using the mixer, the plurality of audio samples for each sentence generated using the text to speech engine with noise from the noise database; and
    - fine tune the ASR model stored in memory using noise augmented audio samples.

2. The system of claim 1 wherein the memory stores speakers and styles that the text to speech engine can emulate.

3. The system of claim 2 wherein the processor is configured to:

receive client audio via the API;

process the audio using the ASR model to produce a speaker separated transcript;

analyze confidence of the speaker separated transcript for each speaker utterance; and if the confidence of the speaker separated transcript of a speaker's utterance is below a threshold confidence limit:

extract an x-vector voice print of the speaker from the client audio;

match the x-vector voice print to a nearest matching speaker in the speakers and styles in the memory;

select the nearest matching speaker from the speakers and styles stored in the memory;

process the speaker's utterance using a processing model to produce a phonetic sequence of the speaker's utterance;

process the phonetic sequence of the speaker's utterance with the nearest matching speaker using the text to speech engine to generate a plurality of nearest matching speaker audio samples;

augment, using the mixer, the plurality of nearest matching speaker audio samples with noise from the noise database; and fine tune the ASR model stored in memory using noise augmented nearest matching speaker audio samples.

4. The system of claim 3 wherein the processor is further configured to concatenate the x-vector voice print with the phonetic sequence of the speaker's utterance;

use a resulting concatenation to generate a problematic speaker audio sample using the text to speech engine;

augment, using the mixer, the problematic speaker audio sample with noise from the noise database; and fine tune the ASR model stored in memory using a noise augmented problematic speaker audio sample.

5. The system of claim 1 wherein the memory stores ASR training text and the processor is further configured to:

process the ASR training text using the pronunciation model to produce a phonetic sequence of the ASR training text;

use the text to speech engine to generate one or more ASR training text audio samples using the phonetic sequence of the ASR training text and a first speaker and style from the speakers and styles in the memory;

augment, using the mixer, the one or more ASR training text audio samples with noise from the noise database; and fine tune the ASR model stored in memory using the one or more noise augmented ASR training text audio samples.

6. The system of claim 5 wherein the processor is further configured to:

process the ASR training text using the pronunciation model to produce a second phonetic sequence of the ASR training text;

use the text to speech engine to generate one or more second ASR training text audio samples using the second phonetic sequence of the ASR training text and a second speaker and style from the speakers and styles in the memory;

augment, using the mixer, the one or more second ASR training text audio samples with noise from the noise database to generate one or more second noise augmented ASR training text audio samples; and fine tune the ASR model stored in memory using one or more second noise augmented ASR training text audio samples.

7. The system of claim 1 wherein the processor uses interpolation using an n-gram language modelling toolkit that uses Neyser Ney Smoothing to add the n-gram based language model to the language model stored in memory.

8. The system of claim 1 wherein the pronunciation model is a Grapheme-to-phoneme model (G2P).

9. The system of claim 1 wherein the language model stored in the memory comprises a lexicon; and the OOV words are words that are words in the client text documents that are not present in the lexicon.

10. A computer implemented method for self-learning end to end automatic speech recognition (ASR), the method comprising:

receiving client text documents via an application programming interface (API);

determining out of vocabulary (OOV) words from the client text documents using a text extractor;

extracting sentences containing OOV words from the client text documents using the text extractor;

using the extracted sentences and a language model builder to create an n-gram based language model;

adding the n-gram based language model to a language model stored in memory;

processing the extracted sentences using a pronunciation model to produce a phonetic sequence of the OOV words; and generating a plurality of audio samples for each sentence using a text to speech engine; and in response to generating the plurality of audio samples for each sentence using the text to speech engine:

augmenting, using a mixer, the plurality of audio samples for each sentence generated using the text to speech engine with noise from a noise database; and fine tuning an ASR model stored in memory using noise augmented audio samples.

11. The method of claim 10 wherein the memory stores speakers and styles that the text to speech engine can emulate.

12. The method of claim 11 wherein the method further comprises:

receiving client audio via the API;

processing the audio using the ASR model to produce a speaker separated transcript;

analyze confidence of the speaker separated transcript for each speaker utterance;

if the confidence of the speaker separated transcript of a speaker's utterance is below a threshold confidence limit:

extracting an x-vector voice print of the speaker from the client audio;

matching the x-vector voice print to a nearest matching speaker in the speakers and styles in the memory;

selecting the nearest matching speaker from the speakers and styles stored in the memory;

processing the speaker's utterance using a processing model to produce a phonetic sequence of the speaker's utterance;

processing the phonetic sequence of the speaker's utterance with the nearest matching speaker using the text to speech engine to generate a plurality of nearest matching speaker audio samples;

augmenting, using the mixer, the plurality of nearest matching speaker audio samples with noise from the noise database; and fine tuning the ASR model stored in memory using noise augmented nearest matching speaker audio samples.

13. The method of claim 12 wherein the method further comprises:

concatenating the x-vector voice print with the phonetic sequence of the speaker's utterance;

using a resulting concatenation to generate a problematic speaker audio sample using the text to speech engine;

augmenting, using the mixer, the problematic speaker audio sample with noise from the noise database; and fine tuning the ASR model stored in memory using a noise augmented problematic speaker audio sample.

14. The method of claim 10 wherein the memory stores ASR training text and the method further comprises:

processing the ASR training text using the pronunciation model to produce a phonetic sequence of the ASR training text;

using the text to speech engine to generate one or more ASR training text audio samples using the phonetic sequence of the ASR training text and a first speaker and style from the speakers and styles in the memory;

augmenting, using the mixer, the one or more ASR training text audio samples with noise from the noise database; and fine tuning the ASR model stored in memory using the one or more noise augmented ASR training text audio samples.

15. The method of claim 14 further comprising:

processing the ASR training text using the pronunciation model to produce a second phonetic sequence of the ASR training text;

using the text to speech engine to generate one or more second ASR training text audio samples using the second phonetic sequence of the ASR training text and a second speaker and style from the speakers and styles in the memory;

augmenting, using the mixer, the one or more second ASR training text audio samples with noise from the noise database to generate one or more second noise augmented ASR training text audio samples; and fine tuning the ASR model stored in memory using one or more second noise augmented ASR training text audio samples.

* * * * *